(12) United States Patent
Kodi et al.

(10) Patent No.: US 11,509,585 B1
(45) Date of Patent: Nov. 22, 2022

(54) BALANCING TRAFFIC OF MULTIPLE REALMS ACROSS MULTIPLE RESOURCES

(71) Applicant: salesforce.com, inc., San Francisco, CA (US)

(72) Inventors: Ahi Kodi, Burlington, MA (US); Arun Sathnur, Boston, MA (US)

(73) Assignee: Salesforce, Inc., San Francisco, CA (US)

( * ) Notice: Subject to any disclaimer, the term of this patent is extended or adjusted under 35 U.S.C. 154(b) by 6 days.

(21) Appl. No.: 17/319,315

(22) Filed: May 13, 2021

(51) Int. Cl.
*H04L 47/125* (2022.01)
*H04L 47/24* (2022.01)
*H04L 47/127* (2022.01)

(52) U.S. Cl.
CPC ......... *H04L 47/125* (2013.01); *H04L 47/127* (2013.01); *H04L 47/245* (2013.01)

(58) Field of Classification Search
CPC ..... H04L 47/24; H04L 47/2433; H04L 47/10; H04L 47/125; H04L 47/245; H04L 47/127
See application file for complete search history.

(56) References Cited

U.S. PATENT DOCUMENTS

| 7,310,673 | B2* | 12/2007 | Zhu | G06F 9/50 |
| | | | | 709/226 |
| 8,095,662 | B1* | 1/2012 | Lappas | G06Q 30/04 |
| | | | | 709/226 |
| 9,094,262 | B2* | 7/2015 | Hueter | H04L 67/1034 |
| 2017/0078372 | A1* | 3/2017 | Gao | H04L 47/70 |
| 2022/0138041 | A1* | 5/2022 | Degrass | G06F 21/57 |
| | | | | 714/38.1 |

OTHER PUBLICATIONS

Noormohammadpour et al, "DatacenterTraffic Control: Understanding Techniques and Tradeoffs", IEEE 2018 (Year: 2018).*

* cited by examiner

*Primary Examiner* — Omer S Mian
(74) *Attorney, Agent, or Firm* — Butzel Long (57) ABSTRACT

Methods, computer readable media, and devices for balancing traffic of multiple realms across multiple resources such that a load balancing algorithm delivers equal flows of traffic to the multiple resources are disclosed. One method may include identifying a high risk realm and two low risk realms from among a plurality of realms, identifying three resources from among a plurality of resources, and distributing the high risk realm, the first low risk realm, and the second low risk realm across the three resources such that the high risk realm and a first low risk realm share a first resource, the high risk realm and a second low risk realm share a second resource, the two low risk realms share a third resource, traffic of the high risk realm is load balanced equally, and traffic of the two low risk realms is load balanced unequally.

15 Claims, 4 Drawing Sheets

BALANCING TRAFFIC OF MULTIPLE REALMS ACROSS MULTIPLE RESOURCES

TECHNICAL FIELD

Embodiments disclosed herein relate to techniques and systems for balancing traffic of multiple realms across multiple resources such that a load balancing algorithm delivers equal flows of traffic to the multiple resources.

BACKGROUND

From a practical perspective, a user accessing a website may be fairly simplistic. For example, a user may enter a uniform resource location (URL)—an address of the website—into a web browser and select the enter key. In response, the web browser may submit a request for the website, receive a response containing content from the website, and render or otherwise display the content within the web browser.

From a technical perspective, a user accessing a website may be fairly complex. For example, the website may experience such a volume of traffic that a single physical server may not be sufficient. In this example, the website may be hosted or otherwise provided by a number of physical servers and the traffic may be distributed across the physical servers using load balancing. However, while a single physical server may be insufficient to serve traffic for the website, the website may not fully utilize all of the available resources of any one physical server when distributed across a number of servers.

In a traditional approach, a fixed number of resources (e.g., physical servers) and a variable number of realms (e.g., websites, databases, files) may be pooled together into what may commonly be referred to as a pod. Such a pod may include a load balancing mechanism (e.g., load balancer) that distributes traffic for the various realms across the resources. In this traditional approach, any single realm may be distributed across some number of the resources and any single resource may provide services on behalf of multiple realms. One algorithm of such load balancing mechanism, the least connection algorithm, may be configured to distribute an equal amount of traffic to a set of resources within the pod. For example, a new connection may be delivered to the resource within the set with the least number of existing connections. However, this algorithm may not take into account that the traffic may actually represent traffic for two or more realms nor that a majority of the traffic may be directed to only one realm. As such, a high traffic realm with relatively lower risk may be appropriately load balanced across multiple resources within the set while a realm with lower traffic but higher risk may not be load balanced, instead having all traffic delivered to a single resource.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques, systems, and devices that allow for balancing traffic of multiple realms across multiple resources such that a load balancing algorithm delivers equal flows of traffic to the multiple resources. In particular, disclosed embodiments may enable distributing a high risk realm and two low risk realms across three resources such that various criteria, including that any one realm may be distributed across at least two resources and the high risk realm may be evenly load balanced while the two low risk realms are unevenly load balanced, may be met. Such cyclical arrangement of three resources and three realms may be referred to, for example, as a load cycle.

In various implementations, a load balancing mechanism may be utilized to distribute traffic destined for three realms across three resources. A realm may be, for example, a website, a database, a collection of content, or the like. Generally, a realm may, for example, represent or otherwise belong to a client, a customer, an organization, a group, an individual, or the like. A resource may be, for example, a physical server or blade and such server may be configured to provide a service, such as a web service, database service, file service, or the like. In some implementations, the load balancing mechanism may utilize a least connection algorithm in order to distribute the traffic to the resources.

Of note, the least connection algorithm may not take into account that a single resource may be providing services on behalf of multiple realms. Instead, the least connection algorithm may simply receive a new connection and deliver such connection to the resource having the fewest number of existing connections.

In a situation where, for example, a high traffic realm and a realm with lower traffic but a relatively higher risk are configured to share three resources, the lower traffic, higher risk realm may end up with all traffic delivered to a single resource representing a single point of failure. As an example, realm A may experience 100 connections while realm B may experience 50 connections. However, realm B may be a high risk realm because of a poor performing user interface (e.g., high response time). In this example, realm A may be distributed across resources X and Y while realm B may be distributed across resources Y and Z. That is, resource Y provides services to both realm A and realm B. Since realm A experiences more traffic, when a new connection for realm B arrives, resource Z may have fewer connections than resource Y and the new connection will be delivered to resource Z. As such, realm A may end up being evenly load balanced across resources X and Y (i.e., 50 connections to resource X and 50 connections to resource Y) while realm B may not be load balanced at all (i.e., all connections to resource Z).

In various implementations, lack of load balancing for a high risk realm may be avoided by grouping the high risk realm with two low risk realms and distributing the three realms across three resources appropriately. For example, realms B, C, and D may be grouped together and distributed across resources X, Y, and Z. In this example, realm B may be a high risk realm and realms C and D may be low risk realms. The three realms may be selected, for example, such that realm B traffic may be less than or equal to twice a sum of realm C and realm D traffic and realm B traffic may be less than or equal to two thirds of a sum of all traffic (i.e, realm B traffic+realm C traffic+realm D traffic). Further in this example, realm B may be distributed across resources X and Y, realm C may be distributed across resources Y and Z, and realm D may be distributed across resources X and Z. Said another way, resource X may be shared by realms B and D, resource Y may be shared by realms B and C, and resource Z may be shared by realms C and D. Since realm B has higher traffic, realm B may be evenly load balanced between resources X and Y. Furthermore, realms C and D may be unevenly load balanced with a majority of their traffic delivered to resource Z. However, realm C may still have a small amount of traffic delivered to resource Y while realm D may still have a small amount of traffic delivered to resource X. In this way, the overall risk of realm B may be mitigated without unduly increasing risk for realms C and D. The cyclical distribution of realms across resources mathematically locks an equal balance of traffic for the high risk realm while also locking an imbalance of traffic for the low risk realms. Stated another way, any pre-existing and affordable imbalance of traffic for low risk realms may be utilized to lock an equal balance of traffic for the high risk realm.

Implementations of the disclosed subject matter provide methods, computer readable media, and devices for balancing traffic of multiple realms across multiple resources such that a load balancing algorithm delivers equal flows of traffic to the multiple resources. In various implementations, a method may include identifying a high risk realm from among a plurality of realms that provide computer-implemented access to one or more services, identifying a first low risk realm and a second low risk realm from among the plurality of realms, identifying three resources from among a plurality of resources that provide one or more computer-implemented services, and distributing the high risk realm, the first low risk realm, and the second low risk realm across the three resources. In some implementations, the three realms may be distributed across the three resources such that the high risk realm may share a first resource with the first low risk realm, the high risk realm may share a second resource with the second low risk realm, the first low risk realm and the second low risk realm may share a third resource, traffic of the high risk realm may be load balanced equally between the first resource and the second resource, traffic of the first low risk realm may be load balanced unequally between the first resource and the third resource, and traffic of the second low risk realm may be load balanced unequally between the second resource and the third resource.

In some implementations, a realm may be a web site and a resource may be a web service.

In some implementations, identifying a high risk realm may include identifying a realm having total traffic less than or equal to two thirds of all combined traffic of the high risk realm, the first low risk realm, and the second low risk realm.

In some implementations, identifying a first low risk realm and a second low risk realm may include identifying a first realm and a second realm such that traffic of the high risk realm may be less than or equal to two times a sum of traffic of the first realm and the second realm.

In some implementations, traffic of the high risk realm, the first low risk realm, and the second low risk realm may be load balanced using a least connection algorithm.

Figure 1A:
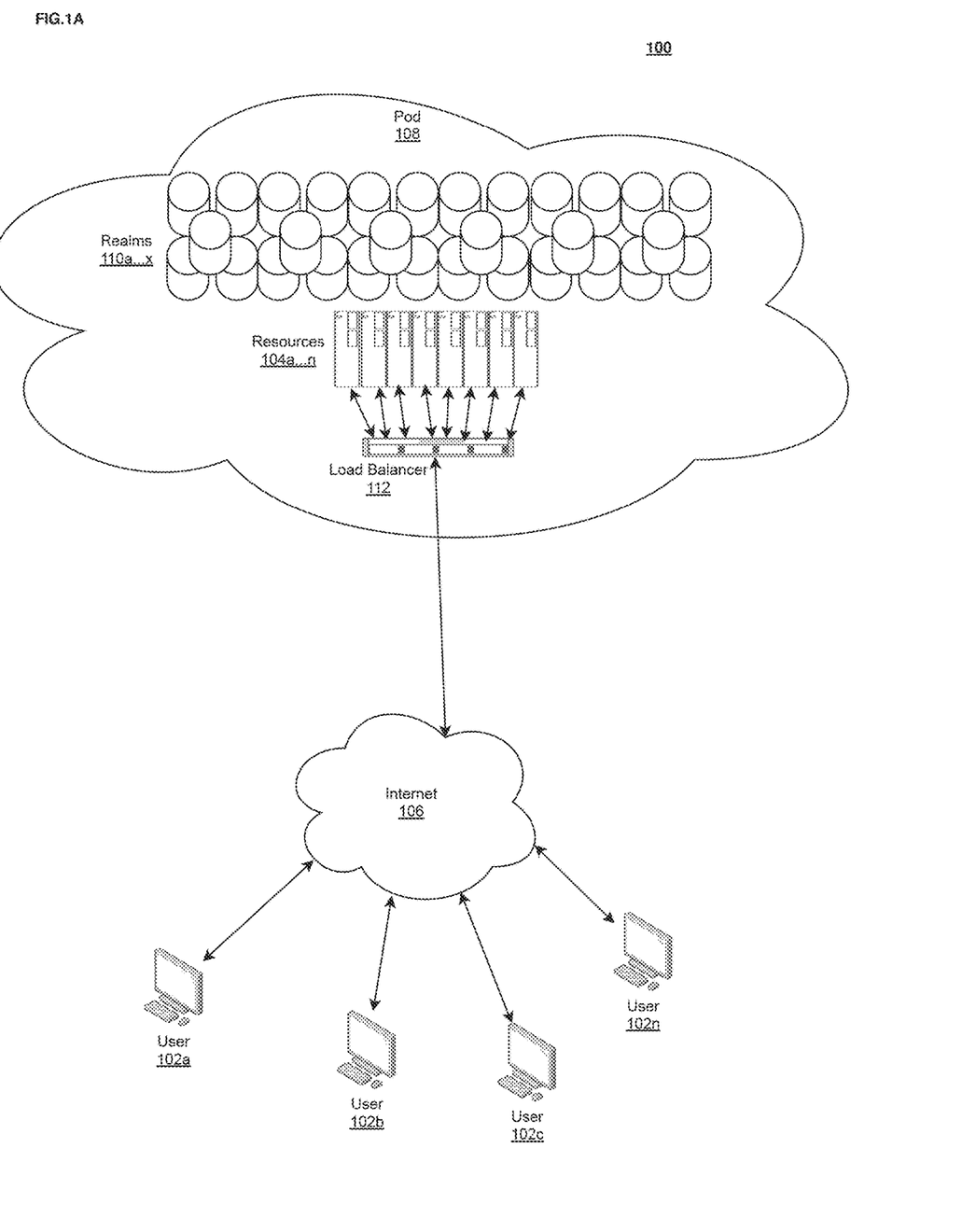
FIG. 1A is a block diagram illustrating a system for use with balancing traffic of multiple realms across multiple resources according to some example implementations.

FIG. 1A illustrates a system 100 for balancing traffic of multiple realms across multiple resources according to various implementations of the subject matter disclosed herein. In various implementations, system 100 may include, for example, users 102a ... n that access or otherwise connect with realms 110a ... x via the Internet 106. Realms 110a ... x may be, for example, websites, databases, file stores, and/or the like provided by or on behalf of various organizations and/or individuals. In some implementations, each realm represents a different organization or individual.

In various implementations, services may be provided, for example, by resources 104a ... n. A resource may be, for example, a web server, database server, file server, and/or other computing resource. In one example, resources 104a ... n may be computing resources that provide access to content provided by realms 110a ... x. In this example, realms 110a ... x may be distributed across resources 104a ... n. That is, any one resource may provide access to one or more realms and access to any one realm may be provided by two or more resources.

In various implementations, realms 110a ... x and resources 104a ... n may be referred to as, for example, a pod, such as pod 108. In some implementations, pod 108 may also include, for example, load balancer 112. Load balancer 112 may, for example, be utilized to distribute traffic from users 102a ... n to resources 104a ... n and realms 110a ... x.

Although FIG. 1A shows a single pod, this is only for simplicity. Furthermore, realms 110a ... x may include, for example, a variable number of realms and resources 104a ... n may include, for example, a fixed number of resources.

Figure 1B:
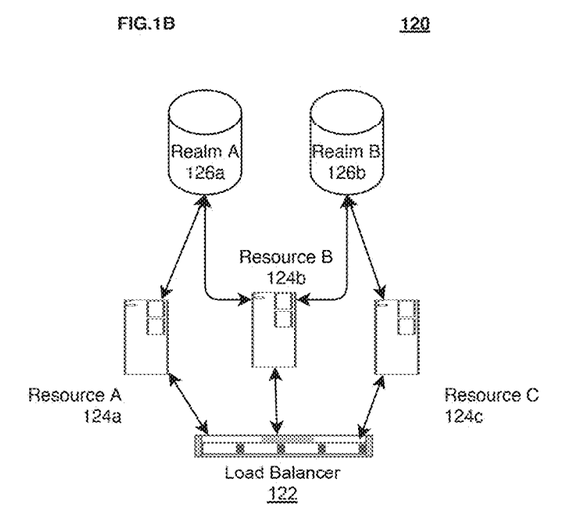
FIGS. 1B-1C are block diagrams illustrating systems for use with balancing traffic of multiple realms across multiple resources according to some example implementations.

FIG. 1B illustrates a system 120 for balancing traffic of multiple realms across multiple resources according to various implementations of the subject matter disclosed herein. In various implementations, system 120 may include load balancer 122, resources A ... C 124a ... c, and realms A, B 126a, 126b. In some implementations, realms A, B 126a, 126b may be, for example, websites and resources A ... C 124a ... c may be, for example, web servers supporting or otherwise providing access to the websites. In one example, realm A 126a may be distributed across resource A 124a and resource B 124b while realm B 126b may be distributed across resource B 124b and resource 124c. In this example, load balancer 122 may distribute traffic destined for the realms across the resources.

In various implementations, load balancer 122 may utilize, for example, a least connection algorithm in order to distribute traffic to the realms. In the least connection algorithm, a newly received request for content may be delivered to a server having a least number of existing connections. Of note, the least connection algorithm may take into account a total number of existing connections for a server regardless of any particular realms supported by the server. For example, if realm A 126*a* experiences 100 requests, load balancer 122, utilizing the least connection algorithm, would deliver 50 requests to resource A 124*a* and 50 requests to resource B 124*b*. However, if realm B 126*b* then experiences 50 requests, load balancer 122, utilizing the least connection algorithm, would deliver all 50 requests to resource C 124*c* because resource B 124*b* would already have received 50 requests. In this example, even though the various requests, in aggregate, may have been distributed "evenly" across the resources, realm B 126*b* may be considered to be high risk because all traffic for the realm is isolated on a single resource which has become a single point of failure. More generally, when a high risk realm is paired with a realm experiencing a higher traffic load and the two realms are distributed across three resources, the least connection algorithm may tend to increase risk associated with the high risk realm by delivering all traffic for the high risk realm to a single resource. This is because the one resource shared by both realms will inevitably not have the least number of connections when a new request for the high risk realm is received since the shared resource is already receiving traffic from the higher volume realm.

Figure 1C:
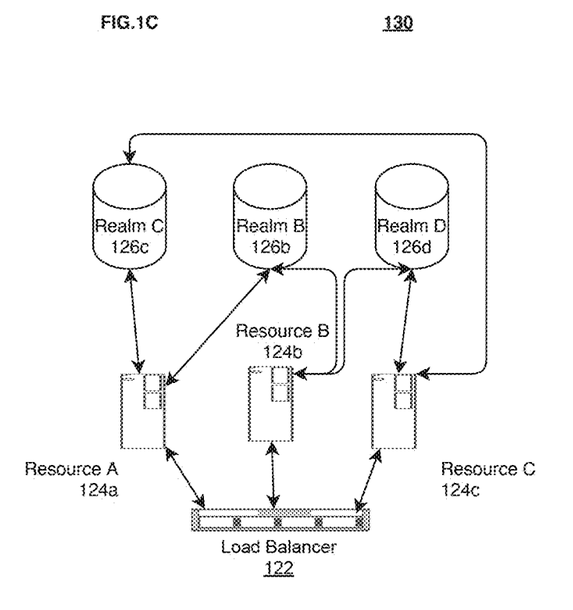

FIG. 1C illustrates a system 130 for balancing traffic of multiple realms across multiple resources according to various implementations of the subject matter disclosed herein. In various implementations, system 130 may include load balancer 122 and resources A . . . C 124*a* . . . *c*. However, in contrast to system 120 of FIG. 1B, system 130 may include realm B 126*b*, realm C 126*c*, and realm D 126*d*. In particular, a high risk realm (e.g., realm B 126*b*) may be identified and grouped together with two low risk realms (e.g., realm C 126*c* and realm D 126*d*) and distributed across the three resources.

In various implementations, the high risk realm and the two low risk realms may be identified, for example, based on a relationship of traffic experienced by the three realms. For example, the high risk realm may experience traffic that is less than or equal to twice the combined traffic of the two low risk realms. Alternatively, or in addition, the high risk realm may experience traffic that is less than or equal to two thirds of the total connections of all three realms. As such, in system 130 of FIG. 1C, realm B 126*b* may experience traffic that is less than or equal to twice the combined traffic of realm C 126*c* and realm D 126*d*. Alternatively, or in addition, realm B 126*b* may experience traffic that is less than or equal to two thirds of the total combined traffic of realms B, C, D 126*b,c,d*.

In various implementations, the high risk realm and the two low risk realms may be distributed across three resources, for example, based on a relationship such that any one realm shares at least one resource with at least one other realm. For example, the high risk realm and a first low risk realm may share a first resource, the high risk realm and a second low risk realm may share a second resource, and the first and second low risk realms may share a third resource. As shown in FIG. 1C, resource A 124*a* may be shared by realm C 126*c* and realm B 126*b*, resource B 124*b* may be shared by realm B 126*b* and realm D 126*d*, and resource C 124*c* may be shared by realm C 126*c* and realm D 126*d*.

Of note, based on such grouping of a high risk realm and two low risk realms and such distribution of the three realms across three resources, the high risk realm will be evenly load balanced or distributed across two resources while the two low risk realms will be unevenly load balanced such that most, but not all, traffic will be delivered to the one resource shared by the two low risk realms. For example, if the high risk realm (e.g., realm B 126*b*) experiences 50 requests, those 50 requests may be distributed evenly across two resources (e.g., 25 requests to resource A 124*a* and 25 requests to resource B 124*b*). Meanwhile, if one low risk realm (e.g., realm C 126*c*) experiences 20 requests, most of those requests will be sent to one resource (e.g., resource C 124*c*). Similarly, if the other low risk realm (e.g., realm D 126*d*) also experiences 20 requests, most of those requests will also be sent to one resource (e.g., resource C 124*c*). However, over time, some number of requests for the low risk realms will be delivered to the resources shared with the high risk realm such that the single resource shared by the two low risk realms will not be a single point of failure. In particular, if the resource shared by the two low risk realms is experiencing total connections greater than the other resources (e.g., resource C 124*c* has 30 connections (15 from realm C 126*c* and 15 from realm D 126*d*) while resource A 124*a* has 25 (all for realm B 126*b*) and resource B 124*b* has 25 (all for realm B 126*b*)), then load balancer 122, using the least connection algorithm, will deliver the next new request for a low risk realm to the resource the low risk realm shares with the high risk realm (e.g., a new connection for realm C 126*c* may be delivered to resource A 124*a*). In this way, any increased risk may be mitigated by identifying appropriate realms to be grouped and distributed across resources without changes to a load balancing algorithm.

Of further note, such grouping of realms and such distribution of realms across resources may be implemented as needed with minimal impact to a production environment. That is, identifying high risk and low risk realms may be repeatedly performed over time, such as monthly, weekly, daily, or even multiple times within a day. The identified realms may then be (re)grouped and (re)distributed across resources without changing any load balance algorithm utilized by a load balancer. As such, the performance of the resources (i.e., physical servers) may be enhanced by mitigating any negative effects of changes in traffic and eliminating any single point of failure.

Figure 2:
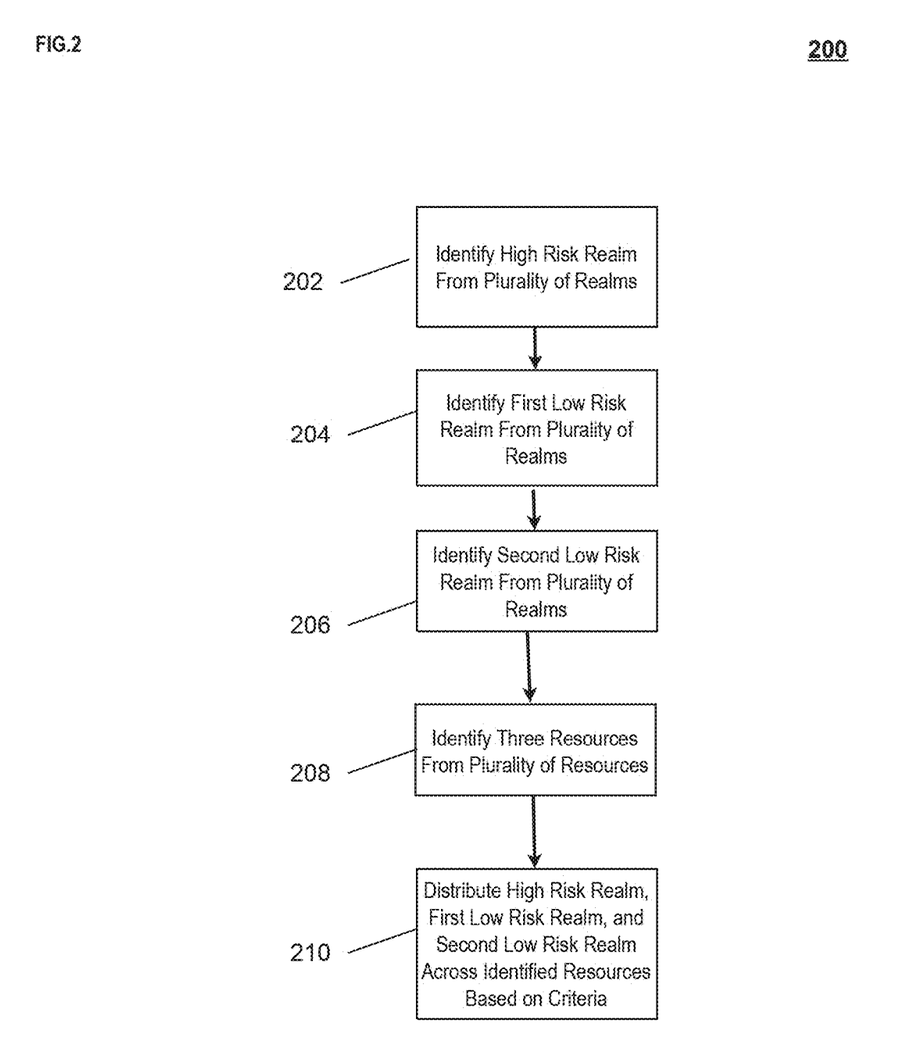
FIG. 2 is a flow diagram illustrating a method for use with distributing risk of multiple realms across multiple resources based on a realm risk model according to some example implementations.

FIG. 2 illustrates a method 200 for balancing traffic of multiple realms across multiple resources, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a high risk realm may be identified from a plurality of realms. In various implementations, a high risk realm may be defined, for example, as a realm that may be experiencing a relatively large amount of traffic and/or may be performing in a suboptimal manner. For example, due to various reasons, the high risk realm may be experiencing high average response times.

In step 204, a first low risk realm may be identified from the plurality of realms. In various implementations, a low risk realm may be defined, for example, as a realm that may be experiencing a relatively small amount of traffic and/or may be performing in an optimal manner. For example, the first low risk realm may be experiencing low average response times.

In step 206, a second low risk realm may be identified from the plurality of realms. In various implementations, the high risk realm and the two low risk realms may be identified, for example, based on a relationship of traffic experienced by the three realms. For example, the high risk realm may experience traffic that is less than or equal to twice the combined traffic of the two low risk realms. Alternatively, or in addition, the high risk realm may experience traffic that is less than or equal to two thirds of the total connections of all three realms.

In step 208, three resources may be identified from a plurality of resources. In various implementations, a resource may be a physical or virtualized server or other computing resource. In some implementations, the three resources may be identified, for example, based on an existing performance level of the resources. For example, the three resources may be identified as resources available to provide services only to the three identified realms.

In step 210, the high risk realm and the two low risk realms may be distributed across the three identified resources based on predetermined criteria. In various implementations, the high risk realm and the two low risk realms may be distributed across the three resources, for example, based on a relationship such that any one realm shares at least one resource with at least one other realm. For example, the high risk realm and the first low risk realm may share a first resource, the high risk realm and the second low risk realm may share a second resource, and the first and second low risk realms may share a third resource.

By identifying a high risk realm and two low risk realms to be grouped together and distributing the three realms across three resources according to predetermined criteria, traffic may be distributed to the various realms efficiently and effectively without modifying a standard load balancing algorithm. Because changes to the load balancing algorithm are not needed, modifications to groupings and distributions may be made as needed with minimal impact to a production environment. In this way, improved utilization of the resources and enhanced performance and availability of the realms may be delivered. In particular, resource utilization may be optimized while eliminating any single point of failure.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
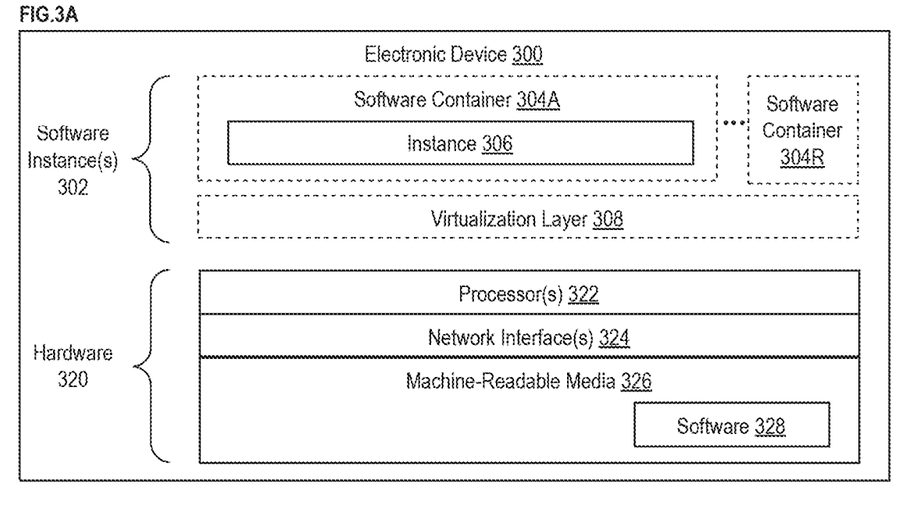
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
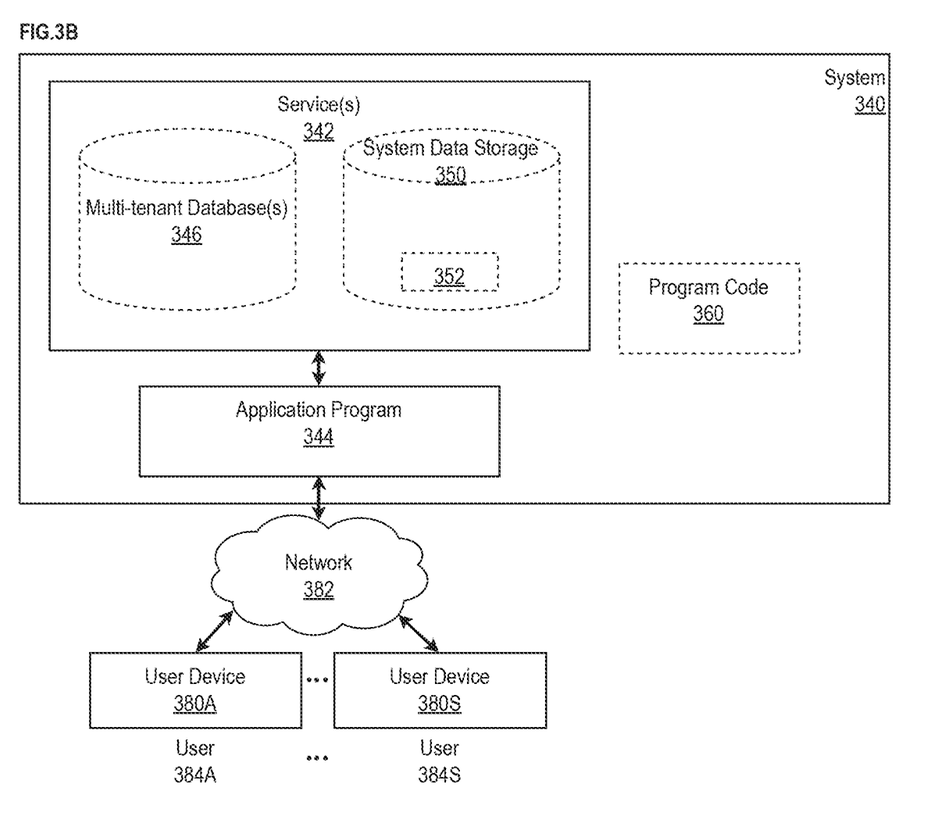
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method of a load-balancing system connected to a plurality of user devices, the method comprising:
    Identifying, by one or more processors of the system, a high risk realm from among a plurality of realms that provide computer-implemented access to one or more services;
    identifying, by at least one of the one or more processors, a first low risk realm and a second low risk realm from among the plurality of realms;
    identifying, by at least one of the one or more processors, three resources from among a plurality of resources that provide one or more computer-implemented services; and
    distributing, by at least one of the one or more processors, the high risk realm, the first low risk realm, and the second low risk realm across the three resources such that:
        the high risk realm shares a first resource with the first low risk realm;
        the high risk realm shares a second resource with the second low risk realm;
        the first low risk realm and the second low risk realm share a third resource;
        traffic of the high risk realm is load balanced equally between the first resource and the second resource;
        traffic of the first low risk realm is load balanced unequally between the first resource and the third resource; and
        traffic of the second low risk realm is load balanced unequally between the second resource and the third resource,
    wherein identifying the high risk realm comprises identifying a realm having total traffic less than a fraction of all combined traffic of the high risk realm, the first low risk realm and the second low risk realm.

2. The computer-implemented method of claim 1, wherein each realm comprises a web site and each resource comprises a web service.

3. The computer-implemented method of claim 1, wherein identifying the high risk realm comprises identifying a realm having total traffic less than or equal to two thirds of all combined traffic of the high risk realm, the first low risk realm, and the second low risk realm.

4. The computer-implemented method of claim 1, wherein identifying the first low risk realm and the second low risk realm comprises identifying a first realm and a second realm such that traffic of the high risk realm is less than or equal to two times a sum of traffic of the first realm and the second realm.

5. The computer-implemented method of claim 1, wherein traffic of the high risk realm, the first low risk realm, and the second low risk realm is load balanced using a least connection algorithm.

6. A non-transitory machine-readable storage medium that provides instructions that, if executed by one or more processors, are configurable to cause the one or more processors to perform operations of a load-balancing system connected to a plurality of user devices, the operations comprising:
    identifying a high risk realm from among a plurality of realms that provide computer-implemented access to one or more services;
    identifying a first low risk realm and a second low risk realm from among the plurality of realms;
    identifying three resources from among a plurality of resources that provide one or more computer-implemented services; and
    distributing the high risk realm, the first low risk realm, and the second low risk realm across the three resources such that:
        the high risk realm shares a first resource with the first low risk realm;

the high risk realm shares a second resource with the second low risk realm;

the first low risk realm and the second low risk realm share a third resource;

traffic of the high risk realm is load balanced equally between the first resource and the second resource;

traffic of the first low risk realm is load balanced unequally between the first resource and the third resource; and traffic of the second low risk realm is load balanced unequally between the second resource and the third resource, wherein identifying the high risk realm comprises identifying a realm having total traffic less than a fraction of all combined traffic of the high risk realm, the first low risk realm and the second low risk realm.

7. The non-transitory machine-readable storage medium of claim 6, wherein each realm comprises a web site and each resource comprises a web service.

8. The non-transitory machine-readable storage medium of claim 6, wherein identifying the high risk realm comprises identifying a realm having total traffic less than or equal to two thirds of all combined traffic of the high risk realm, the first low risk realm, and the second low risk realm.

9. The non-transitory machine-readable storage medium of claim 6, wherein identifying the first low risk realm and the second low risk realm comprises identifying a first realm and a second realm such that traffic of the high risk realm is less than or equal to two times a sum of traffic of the first realm and the second realm.

10. The non-transitory machine-readable storage medium of claim 6, wherein traffic of the high risk realm, the first low risk realm, and the second low risk realm is load balanced using a least connection algorithm.

11. A load-balancing apparatus connected to a plurality of user devices, the apparatus comprising:

one or more processors; and a non-transitory machine-readable storage medium that provides instructions which, when executed by the one or more processors, are configurable to cause the one or more processors to perform operations comprising:

identifying a high risk realm from among a plurality of realms that provide computer-implemented access to one or more services;

identifying a first low risk realm and a second low risk realm from among the plurality of realms;

identifying three resources from among a plurality of resources that provide one or more computer-implemented services; and distributing the high risk realm, the first low risk realm, and the second low risk realm across the three resources such that:

the high risk realm shares a first resource with the first low risk realm;

the high risk realm shares a second resource with the second low risk realm;

the first low risk realm and the second low risk realm share a third resource;

traffic of the high risk realm is load balanced equally between the first resource and the second resource;

traffic of the first low risk realm is load balanced unequally between the first resource and the third resource; and traffic of the second low risk realm is load balanced unequally between the second resource and the third resource, wherein identifying the high risk realm comprises identifying a realm having total traffic less than a fraction of all combined traffic of the high risk realm, the first low risk realm and the second low risk realm.

12. The apparatus of claim 11, wherein each realm comprises a web site and each resource comprises a web service.

13. The apparatus of claim 11, wherein identifying the high risk realm comprises identifying a realm having total traffic less than or equal to two thirds of all combined traffic of the high risk realm, the first low risk realm, and the second low risk realm.

14. The apparatus of claim 11, wherein identifying the first low risk realm and the second low risk realm comprises identifying a first realm and a second realm such that traffic of the high risk realm is less than or equal to two times a sum of traffic of the first realm and the second realm.

15. The apparatus of claim 11, wherein traffic of the high risk realm, the first low risk realm, and the second low risk realm is load balanced using a least connection algorithm.

* * * * *